(12) United States Patent
Huang

(10) Patent No.: US 12,504,914 B2
(45) Date of Patent: Dec. 23, 2025

(54) MEMORY CONTROL CIRCUIT UNIT, MEMORY STORAGE DEVICE, AND CLOCK SIGNAL CONTROL METHOD

(71) Applicant: PHISON ELECTRONICS CORP., Miaoli (TW)

(72) Inventor: Ming-Chien Huang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 180 days.

(21) Appl. No.: 17/978,234

(22) Filed: Nov. 1, 2022

(65) Prior Publication Data

US 2024/0111448 A1    Apr. 4, 2024

(30) Foreign Application Priority Data

Sep. 29, 2022    (TW) .................................. 111136991

(51) Int. Cl.
*G06F 3/06*    (2006.01)
*G06F 1/04*    (2006.01)

(52) U.S. Cl.
CPC .............. *G06F 3/0655* (2013.01); *G06F 1/04* (2013.01); *G06F 3/0604* (2013.01); *G06F 3/0679* (2013.01)

(58) Field of Classification Search
CPC .................................. G06F 1/04; G11C 7/222
See application file for complete search history.

(56) References Cited

U.S. PATENT DOCUMENTS

| | | | |
|---|---|---|---|
| 2019/0215146 A1* | 7/2019 | Ke | H04L 7/042 |
| 2024/0012444 A1* | 1/2024 | Cheng | G11C 29/023 |
| 2024/0046976 A1* | 2/2024 | Pilolli | G11C 16/10 |

* cited by examiner

*Primary Examiner* — Nicholas A. Paperno
(74) *Attorney, Agent, or Firm* — JCIPRNET

(57) ABSTRACT

A clock signal control method is provided according to an exemplary embodiment of the disclosure. In the method, an access operation is executed on a volatile memory module through a memory interface circuit, and a duty cycle of a first clock signal is set according to a type of the access operation. Furthermore, the first clock signal is transmitted to the volatile memory module to execute the access operation.

21 Claims, 4 Drawing Sheets

MEMORY CONTROL CIRCUIT UNIT, MEMORY STORAGE DEVICE, AND CLOCK SIGNAL CONTROL METHOD

CROSS-REFERENCE TO RELATED APPLICATION

This application claims the priority benefit of Taiwan application serial no. 111136991, filed on Sep. 29, 2022. The entirety of the above-mentioned patent application is hereby incorporated by reference herein and made a part of this specification.

BACKGROUND

Technical Field

The disclosure relates to a memory control technology, and particularly relates to a memory control circuit unit, a memory storage device, and a clock signal control method.

Description of Related Art

Volatile memory such as dynamic random access memory (DRAM) has advantages such as fast access speed and small volume, so the volatile memory is considerably suitable to be installed in a portable electronic device as a temporary storage medium of data. In addition, a memory controller may be used to control and access the volatile memory.

Generally speaking, the duty cycle of the clock signal used by the memory controller to communicate with the volatile memory is set (as, for example, 40%, 50%, etc.) before the memory controller leaves the factory and is not dynamically adjusted for different operating states. However, in practice, using the clock signal with the fixed duty cycle cannot achieve the optimal signal quality in all various types of access operations (for example, a data write operation and a data read operation) to the volatile memory.

SUMMARY

The disclosure provides a memory control circuit unit, a memory storage device, and a clock signal control method, which can improve the access signal quality of a volatile memory module.

An exemplary embodiment of the disclosure provides a memory control circuit unit, which is used to control a volatile memory module. The memory control circuit unit includes a memory interface circuit and a memory controller. The memory interface circuit is used to couple to the volatile memory module. The memory controller is coupled to the memory interface circuit. The memory controller is used to execute an access operation on the volatile memory module through the memory interface circuit. The memory interface circuit is used to set a duty cycle of a first clock signal according to a type of the access operation. The memory interface circuit is further used to transmit the first clock signal to the volatile memory module to execute the access operation.

An exemplary embodiment of the disclosure further provides a memory storage device, which includes a connection interface unit, a rewritable non-volatile memory module, a volatile memory module, and a memory control circuit unit. The connection interface unit is used to couple to a host system. The memory control circuit unit is coupled to the connection interface unit, the rewritable non-volatile memory module, and the volatile memory module. The memory control circuit unit is used to: execute an access operation on the volatile memory module through a memory interface circuit; set a duty cycle of a first clock signal according to a type of the access operation; and transmit the first clock signal to the volatile memory module to execute the access operation.

An exemplary embodiment of the disclosure further provides a clock signal control method for a memory control circuit unit. The clock signal control method includes: executing an access operation on a volatile memory module through a memory interface circuit; setting a duty cycle of a first clock signal according to a type of the access operation; and transmitting the first clock signal to the volatile memory module to execute the access operation.

Based on the above, the memory controller may execute the access operation on the volatile memory module through the memory interface circuit. In particular, the memory interface circuit may set the duty cycle of the first clock signal according to the type of the access operation and transmit the first clock signal to the volatile memory module to execute the access operation. As such, through dynamically adjusting the duty cycle of the first clock signal according to different access operations, the access signal quality of the volatile memory module can be effectively improved.

DETAILED DESCRIPTION OF DISCLOSED EMBODIMENTS

Several exemplary embodiments are presented below to illustrate the disclosure, but the disclosure is not limited to the illustrated exemplary embodiments. Appropriate combinations are also permitted between the exemplary embodiments. The term "coupling" as used throughout the specification (including the scope of the claims) may refer to any direct or indirect connection means. For example, if a first device is described as being coupled to a second device, it should be interpreted that the first device may be directly connected to the second device or the first device may be indirectly connected to the second device through other devices or certain connection means. In addition, the term "signal" may refer to at least one current, voltage, charge, temperature, data, or any other one or more signals.

Figure 1:
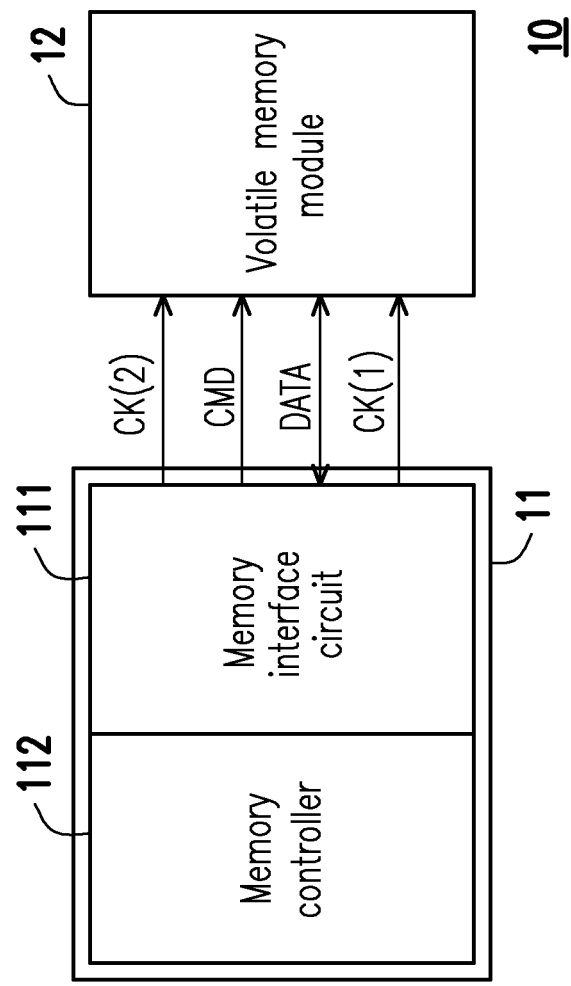
FIG. 1 is a schematic diagram of a memory storage device according to an exemplary embodiment of the disclosure.

FIG. 1 is a schematic diagram of a memory storage device according to an exemplary embodiment of the disclosure. Please refer to FIG. 1. A memory storage device 10 includes a memory control circuit unit 11 and a volatile memory module 12.

The memory control circuit unit 11 may be used to control and access the volatile memory module 12. For example, the memory control circuit unit 11 may include a central processing unit (CPU), other programmable general-purpose or specific-purpose microprocessors, digital signal processors (DSPs), programmable controllers, application specific integrated circuits (ASICs), programmable logic devices (PLDs), other similar devices, or a combination of the devices.

The volatile memory module 12 may be used to temporarily store data. For example, the volatile memory module 12 may include a double data rate fifth-generation synchronous dynamic random-access memory (DDR5 SDRAM) or other types of volatile memories. The memory control circuit unit 11 may store data into the volatile memory module 12 or read data from the volatile memory module 12. In addition, the number of the volatile memory module 12 may be one or more, which is not limited in the disclosure.

The memory control circuit unit 11 may include a memory interface circuit 111 and a memory controller 112. The memory interface circuit 111 is used to couple to the volatile memory module 12. For example, the memory interface circuit 111 may communicate with the volatile memory module 12 via the peripheral component interconnect (PCI) express standard or other types of connection interface standards.

The memory controller 112 is coupled to the memory interface circuit 111. The memory controller 112 may execute an access operation on the volatile memory module 12 via the memory interface circuit 111. For example, the access operation may include a data read operation and a data write operation. The data read operation is used to read data from the volatile memory module 12. The data write operation is used to write (that is, store) data into the volatile memory module 12. In an exemplary embodiment, the memory controller 112 is also referred to as a dynamic random-access memory (SRAM) controller.

The memory controller 112 may send a corresponding command signal CMD to the volatile memory module 12 via the memory interface circuit 111 according to the access operation to be executed. The volatile memory module 12 may execute a corresponding access behavior according to the command signal CMD.

In an exemplary embodiment, in the data read operation, the memory controller 112 may transmit the command signal CMD with a read command sequence to the volatile memory module 12 via the memory interface circuit 111. The read command sequence may instruct the volatile memory module 12 to read data from a specific logical address (or virtual address). A memory address corresponding to the logical address (or the virtual address) is located inside the volatile memory module 12. The volatile memory module 12 may read data from the specific memory address according to the command signal CMD with the read command sequence and transmit the read data to the memory interface circuit 111 via a data signal DATA. The memory controller 112 may analyze the data signal DATA via the memory interface circuit 111 to obtain the data to be read.

In an exemplary embodiment, in the data write operation, the memory controller 112 may transmit the command signal CMD with a write command sequence and the data signal DATA with data to be stored to the volatile memory module 12 via the memory interface circuit 111. The write command sequence may instruct the volatile memory module 12 to write (that is, store) the data carried by the data signal DATA to a specific logical address (or virtual address). A memory address corresponding to the logical address (or the virtual address) is also located inside the volatile memory module 12. The volatile memory module 12 may write the data to be stored into the specific internal memory address according to the command signal CMD and the data signal DATA.

In an exemplary embodiment, the memory interface circuit 111 may generate a clock signal (also referred to as a first clock signal) CK(1) and transmit the clock signal CK(1) to the volatile memory module 12. The volatile memory module 12 may execute a corresponding data read and/or data write behavior according to the clock signal CK(1). For example, in the data read operation, the volatile memory module 12 may transmit the data signal DATA to the memory interface circuit 111 according to the clock signal CK(1). In addition, in the data write operation, the volatile memory module 12 may sample the data signal DATA from the memory interface circuit 111 according to the clock signal CK(1) to obtain the data to be stored.

The memory interface circuit 111 may set a duty cycle of the clock signal CK(1) according to a type of the access operation to be executed. It should be noted that the duty cycle of the clock signal CK(1) indicates a ratio of a duty time (for example, the duration of a positive half cycle or a pulse duration) in the clock signal CK(1) to the total time length within one clock cycle. For example, assuming that the duty cycle of the clock signal CK(1) is 47%, it means that the duty time (for example, the duration of the positive half cycle or the pulse duration) in the clock signal CK(1) accounts for 47% of the total time length within one clock cycle of the clock signal CK(1). Then, the memory interface circuit 11 may transmit the clock signal CK(1) with the set duty cycle to the volatile memory module 12 to execute the corresponding access operation.

Traditionally, the duty cycle of the clock signal used by the memory controller to communicate with the volatile memory is set (as, for example, 40%, 50%, etc.) before the memory controller leaves the factory and is not dynamically adjusted for different operating states. However, in practice, using the clock signal with the fixed duty cycle cannot achieve the optimal signal quality in all various types of access operations (for example, the data write operation and the data read operation) to the volatile memory. In contrast, in the disclosure, setting the duty cycle of the clock signal CK(1) according to the type of the access operation to be executed can effectively improve the access signal quality of the volatile memory module 12 for different types of access behaviors.

In an exemplary embodiment, in response to the access operation to be executed being a first type access operation, the memory interface circuit 111 may set the duty cycle of the clock signal CK(1) to a certain duty cycle (also referred to as a first duty cycle). Thereafter, the volatile memory module 12 may execute the first type access operation according to the clock signal CK(1) with the first duty cycle. For example, the clock signal CK(1) with the first duty cycle may be used to improve the signal quality of the first type access operation executed by the volatile memory module 12. However, the clock signal CK(1) with the first duty cycle may not improve or even degrade the signal quality of a second type access operation executed by the volatile memory module 12.

In an exemplary embodiment, in response to the access operation to be executed being the second type access operation, the memory interface circuit 111 may set the duty cycle of the clock signal CK(1) to another duty cycle (also referred to as a second duty cycle). The first type access operation is different from the second type access operation, and the first duty cycle is different from the second duty cycle. Thereafter, the volatile memory module 12 may execute the second type access operation according to the clock signal CK(1) with the second duty cycle. For example, the clock signal CK(1) with the second duty cycle may be used to improve the signal quality of the second type access operation executed by the volatile memory module 12. However, the clock signal CK(1) with the second duty cycle may not improve or even degrade the signal quality of the first type access operation executed by the volatile memory module 12.

In an exemplary embodiment, it is assumed that the first type access operation is the data read operation, and the second type access operation is the data write operation. Therefore, the first duty cycle may be 47%, and the second duty cycle may be 40%, but the disclosure is not limited thereto. In other exemplary embodiments, according to the type of the access operation, the first duty cycle and/or the second duty cycle may be adjusted according to practical requirements.

In an exemplary embodiment, the first duty cycle is a default duty cycle of the clock signal CK(1), and the memory interface circuit 111 may store duty cycle setting data. For example, the duty cycle setting data may include information that may be used to set and/or adjust the duty cycle of the clock signal CK(1). For example, the duty cycle setting data may include setting information corresponding to the second duty cycle. For example, the duty cycle setting data may reflect a ratio (for example, 40%) of the second duty cycle in one clock cycle. In addition, the duty cycle setting data may also include setting information corresponding to the first duty cycle. For example, the duty cycle setting data may also reflect a ratio (for example, 47%) of the first duty cycle in one clock cycle. The memory interface circuit 111 may set (including adjust and/or switch) the duty cycle of the clock signal CK(1) according to the duty cycle setting data. Alternatively, in an exemplary embodiment, the duty cycle setting data may also reflect a setting value of the duty cycle of the clock signal CK(1) under one or more usage scenarios.

In an exemplary embodiment, in response to the access operation to be executed being the second type access operation, the memory interface circuit 111 may switch the duty cycle of the clock signal CK(1) from the first duty cycle (that is, the default duty cycle) to the second duty cycle according to the duty cycle setting data. After the second type access operation is completed, the memory interface circuit 111 may restore the duty cycle of the clock signal CK(1) from the second duty cycle to the first duty cycle (that is, the default duty cycle). For example, the completion of the second type access operation means that one or more write command sequences corresponding to a single data write operation have all been sent to the volatile memory module 12 or reached the volatile memory module 12. The write command sequence is used to instruct the volatile memory module 12 to store data. In addition, in response to the access operation to be executed being the first type access operation, the memory interface circuit 111 may maintain the duty cycle of the clock signal CK(1) as the first duty cycle (that is, the default duty cycle).

In an exemplary embodiment, if the type of the access operation to be executed does not change, for example, the previously executed access operation and the next access operation to be executed are of the same type (for example, are both the first type access operation or the second type access operation), the memory interface circuit 111 may not adjust the duty cycle of the clock signal CK(1). However, in response to a change in the type of the access operation to be executed, such as changing from the previously executed first type access operation to executing the second type access operation or from the previously executed second type access operation to executing the first type access operation, the memory interface circuit 111 may adjust the duty cycle of the clock signal CK(1) to improve the signal quality of the next or current access operation executed by the volatile memory module 12.

In an exemplary embodiment, the memory interface circuit 111 may also generate a clock signal (also referred to as a second clock signal) CK(2) and transmit the clock signal CK(2) to the volatile memory module 12. The volatile memory module 12 may obtain a basic clock of a controller side according to the clock signal CK(2). For example, the volatile memory module 12 may set an internal reference clock according to the clock signal CK(2). However, it should be noted that compared with the clock signal CK(1), a duty cycle of the clock signal CK(2) is a default value and does not change according to the type of the access operation to be executed. In addition, the clock signals CK(1) and CK(2) may be transmitted to the volatile memory module 12 through different interfaces or signal paths.

Figure 2:
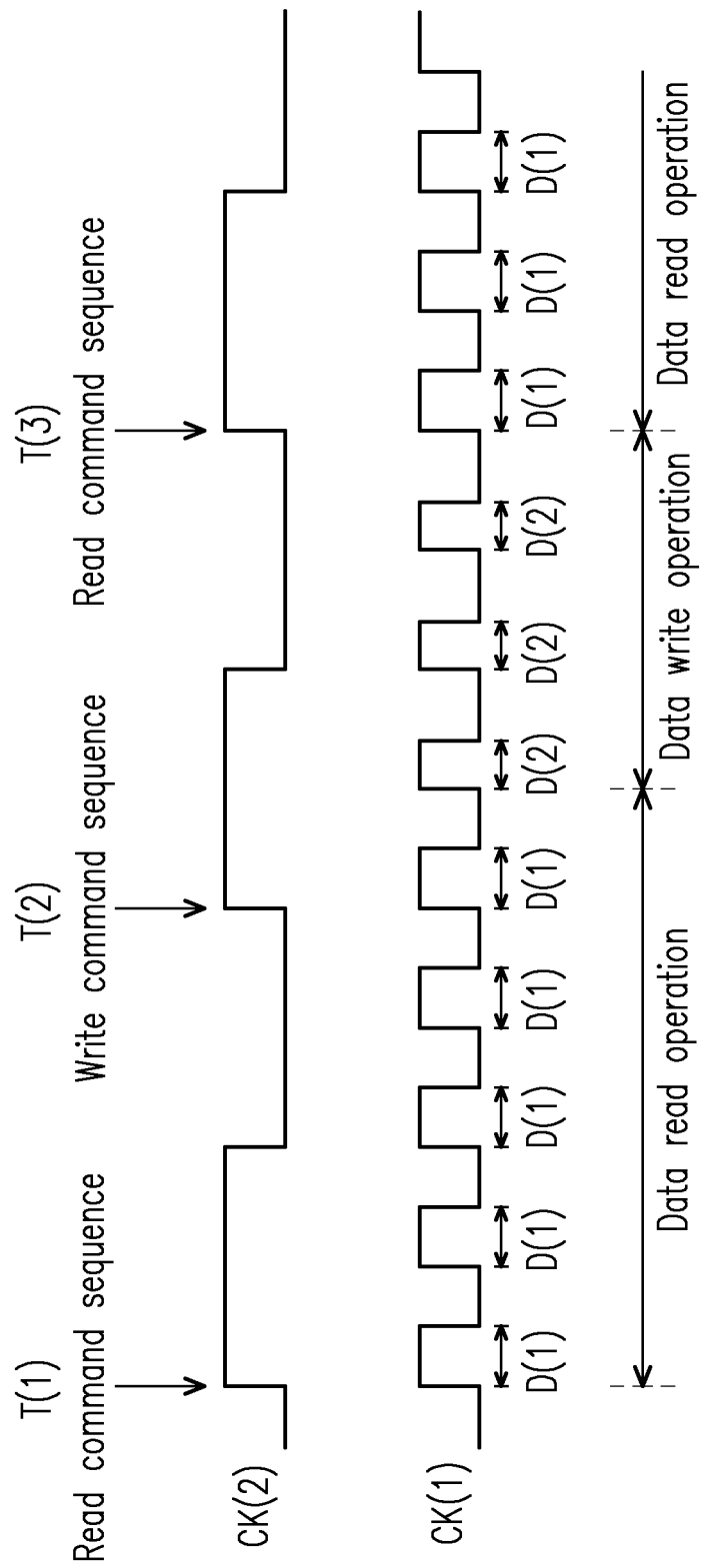
FIG. 2 is a schematic diagram of setting a duty cycle of a first clock signal according to a type of an access operation according to an exemplary embodiment of the disclosure.

FIG. 2 is a schematic diagram of setting a duty cycle of a first clock signal according to a type of an access operation according to an exemplary embodiment of the disclosure. Please refer to FIG. 1 and FIG. 2. It is assumed that after a time point T(1), the memory controller 112 transmits the read command sequence to the volatile memory module 12 via the memory interface circuit 111 to instruct the volatile memory module 12 to execute the data read operation. In response to the access operation to be executed being the data read operation (for example, the first type access operation), the memory interface circuit 111 may set (or maintain) the duty cycle of the clock signal CK(1) as D(1) (for example, the first duty cycle or the default duty cycle). For example, a time length corresponding to D(1) may account for 47% of the total time length within one clock cycle of the clock signal CK(1), and the time length corresponding to D(1) may be adjusted according to practical requirements. Therefore, after the time point T(1), the read command sequence may be transmitted to the volatile memory module 12 synchronously with the clock signal CK(1) with the duty cycle of D(1). The volatile memory module 12 may execute the data read operation according to the clock signal CK(1) with the duty cycle of D(1) and the read command sequence, so as to improve the signal quality of the data read operation executed by the volatile memory module 12.

After executing the data read operation, after a time point T(2), the memory controller 112 transmits the write command sequence to the volatile memory module 12 via the memory interface circuit 111 to instruct the volatile memory module 12 to execute the data write operation. In response to changing the access operation to be executed to the data write operation (for example, the second type access operation), the memory interface circuit 111 may adjust the duty cycle of the clock signal CK(1) from D(1) to D(2) (for example, the second duty cycle). For example, a time length corresponding to D(2) may account for 40% of the total time length within one clock cycle of the clock signal CK(1), and the time length corresponding to D(2) may be adjusted according to practical requirements. Therefore, after the time point T(2), the write command sequence may be transmitted to the volatile memory module 12 synchronously with the clock signal CK(1) with the duty cycle of D(2). The volatile memory module 12 may execute the data write operation according to the clock signal CK(1) with the duty cycle of D(2) and the write command sequence, so as to improve the signal quality of the data write operation executed by the volatile memory module 12.

After executing the data write operation, after a time point T(3), the memory controller 112 transmits the read command sequence to the volatile memory module 12 via the memory interface circuit 111 again to instruct the volatile memory module 12 to execute the data read operation. In response to changing (or restoring) the access operation to be executed to the data read operation (for example, the first type access operation), the memory interface circuit 111 may adjust (for example, restore) the duty cycle of the clock signal CK(1) from D(2) to D(1) (for example, the first duty cycle or the default duty cycle). Therefore, after the time point T(3), the read command sequence may be transmitted to the volatile memory module 12 synchronously with the clock signal CK(1) with the duty cycle of D(1). The volatile memory module 12 may restore to executing the data read operation according to the clock signal CK(1) with the duty cycle of D(1) and the read command sequence, so as to improve the signal quality of the data read operation executed by the volatile memory module 12. In addition, in an exemplary embodiment, after the writing command sequence is sent, the memory interface circuit 111 may also automatically adjust (for example, restore) the duty cycle of the clock signal CK(1) from D(2) to D(1), regardless of whether to send a new read command sequence or execute the next data read operation.

It should be noted that in the exemplary embodiment of FIG. 2, an execution order of different types of access operations and the duty cycle of the clock signal CK(1) corresponding to various types of access operations are all examples and are not used to limit the disclosure.

Figure 3:
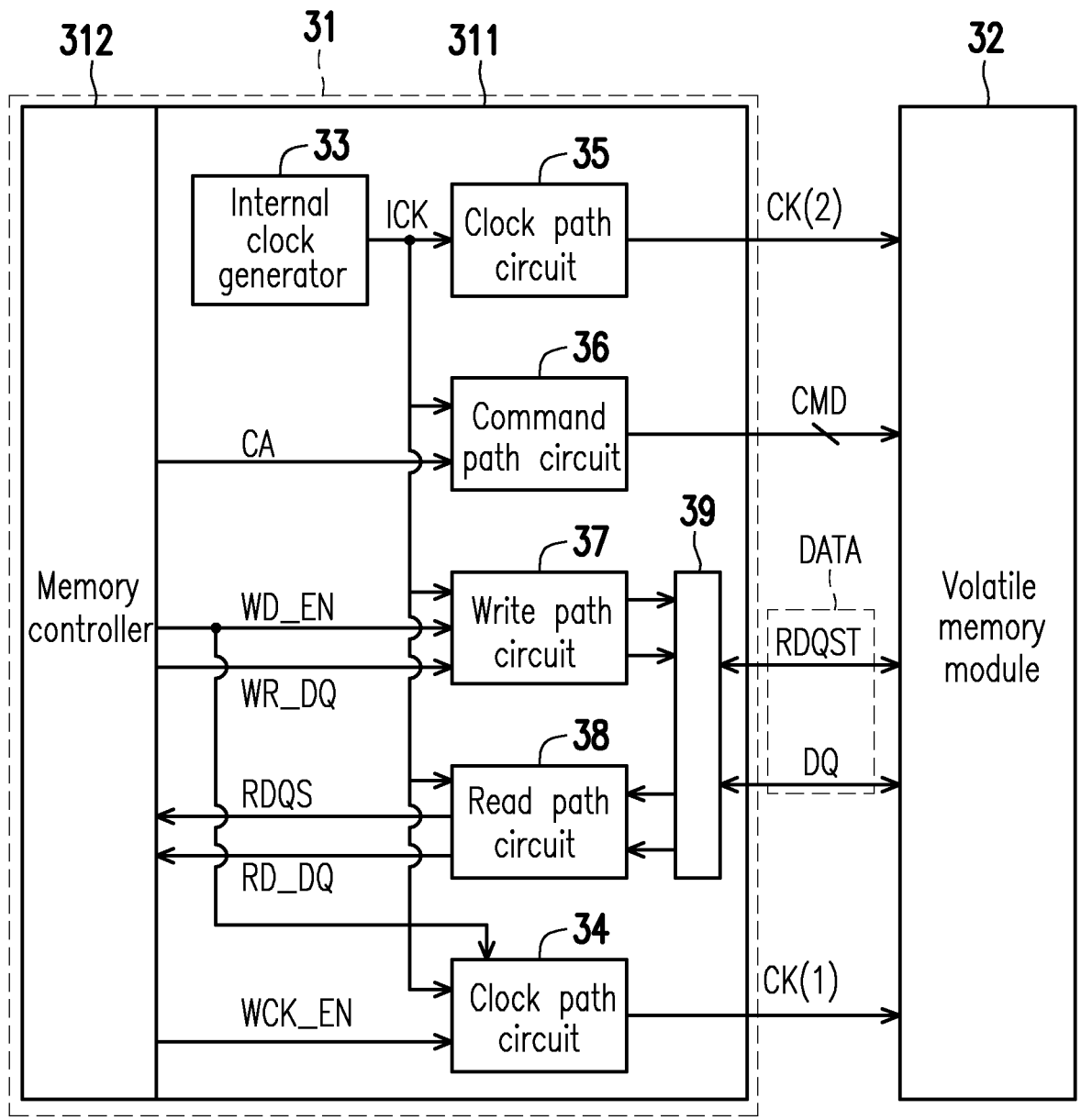
FIG. 3 is a schematic diagram of a memory storage device according to an exemplary embodiment of the disclosure.

FIG. 3 is a schematic diagram of a memory storage device according to an exemplary embodiment of the disclosure. Please refer to FIG. 3. A memory storage device 30 includes a memory control circuit unit 31 and a volatile memory module 32. The memory control circuit unit 31 and the volatile memory module 32 may be respectively the same as or similar to the memory control circuit unit 11 and the volatile memory module 12 of FIG. 1.

The memory control circuit unit 31 includes a memory interface circuit 311 and a memory controller 312. The memory interface circuit 311 and the memory controller 312 may be respectively the same as or similar to the memory interface circuit 111 and the memory controller 112 of FIG. 1.

The memory interface circuit 311 includes an internal clock generator 33 and a clock path circuit (also referred to as a first clock path circuit) 34. The internal clock generator 33 is used to generate a clock signal (also referred to as an internal clock signal) ICK. The clock path circuit 34 is coupled to the memory controller 312, the internal clock generator 33, and the volatile memory module 32. The clock path circuit 34 may receive the clock signal ICK and an enable signal (also referred to a first enable signal) WCK_EN. The clock path circuit 34 may generate the clock signal CK(1) according to the clock signal ICK and the enable signal WCK_EN.

On the other hand, the memory controller 312 may generate an enable signal (also referred to a second enable signal or a write enable signal) WD_EN according to the type of the access operation to be executed. The clock path circuit 34 may also receive the enable signal WD_EN. The clock path circuit 34 may adjust the duty cycle of the clock signal CK(1) according to the enable signal WD_EN. Alternatively, from another perspective, the clock path circuit 34 may generate the clock signal CK(1) according to the enable signal WD_EN, the clock signal ICK, and the enable signal WCK_EN. The clock path circuit 34 may then transmit the clock signal CK(1) to the volatile memory module 32.

In an exemplary embodiment, at a certain time point, in response to the current access operation to be executed being the first type access operation (for example, the data read operation), the memory controller 312 may not generate the enable signal WD_EN. In this case, the clock path circuit 34 may generate the clock signal CK(1) with the first duty cycle according to the clock signal ICK and the enable signal WCK_EN. However, at another time point, in response to the current access operation to be executed being the second type access operation (for example, the data write operation), the memory controller 312 may generate the enable signal WD_EN. In this case, the clock path circuit 34 may generate the clock signal CK(1) with the second duty cycle according to the enable signal WD_EN, the clock signal ICK, and the enable signal WCK_EN.

In an exemplary embodiment, the memory interface circuit 311 further includes a clock path circuit (also referred to as a second clock path circuit) 35. The clock path circuit 35 is coupled to the internal clock generator 33 and the volatile memory module 32. The clock path circuit 35 may receive the clock signal ICK and transmit the clock signal CK(2) to the volatile memory module 32 according to the clock signal ICK. It should be noted that the duty cycle of the clock signal CK(2) may be a default value and may not change according to the type of the access operation to be executed.

In an exemplary embodiment, the memory interface circuit 311 further includes a command path circuit 36. The command path circuit 36 is coupled to the memory controller 312, the internal clock generator 33, and the volatile memory module 32. The command path circuit 36 is used to receive command information CA related to the access operation to be executed from the memory controller 312 and receive the clock signal ICK from the internal clock generator 33. The command path circuit 36 may transmit the command signal CMD to the volatile memory module 32 according to the command information CA and the clock signal ICK. The command signal CMD may carry a command sequence (for example, the read command sequence or the write command sequence). The volatile memory module 32 may execute the corresponding access operation according to the command signal CMD.

In an exemplary embodiment, the memory interface circuit 311 further includes a write path circuit 37, a read path circuit 38, and a multiplexer circuit 39. The write path circuit 37 and the read path circuit 38 are both coupled to the memory controller 312 and the internal clock generator 33. The multiplexer circuit 39 is coupled to the write path circuit 37, the read path circuit 38, and the volatile memory module 32. The write path circuit 37 and the read path circuit 38 may both receive the clock signal ICK from the internal clock generator 33.

When the memory controller 312 executes the data write operation, the write path circuit 37 may also receive the enable signal WD_EN and an internal data signal WR_DQ from the memory controller 312. The write path circuit 37 may generate the data signal DATA according to the enable signal WD_EN, the internal clock signal ICK, and the internal data signal WR_DQ. The data signal DATA carries information related to data to be stored. For example, the data signal DATA may include an RDQST signal and a DQ signal. The RDQST signal may be used to transmit information of an error correcting code related to the data to be stored. The DQ signal may be used to transmit the data to be stored. The write path circuit 37 may transmit the data signal DATA to the volatile memory module 32 via the multiplexer circuit 39. Meanwhile, in response to the enable signal WD_EN, the clock path circuit 34 may transmit the clock signal CK(1) with the second duty cycle to the volatile memory module 32. The volatile memory module 32 may execute the data write operation according to the command signal CMD, the data signal DATA, and the clock signal CK(1) with the second duty cycle from the memory interface circuit 311.

On the other hand, when the memory controller 312 executes the data read operation, the clock path circuit 34 does not receive the enable signal WD_EN, so the clock path circuit 34 may transmit the clock signal CK(1) with the first duty cycle to the volatile memory module 32. The volatile memory module 32 may execute the data read operation according to the command signal CMD and the clock signal CK(1) with the first duty cycle from the memory interface circuit 311. The read path circuit 38 may receive the data signal DATA from the volatile memory module 32 via the multiplexer circuit 39. The data signal DATA from the volatile memory module 32 may carry information related to the data to be read. The read path circuit 38 may transmit an RDQS signal and an RD_DQ signal to the memory controller 312 according to the data signal DATA. For example, the RDQS signal may be used to transmit the clock signal corresponding to the RD_DQ signal. The RD_DQ signal may be used to transmit the read data.

Figure 4:
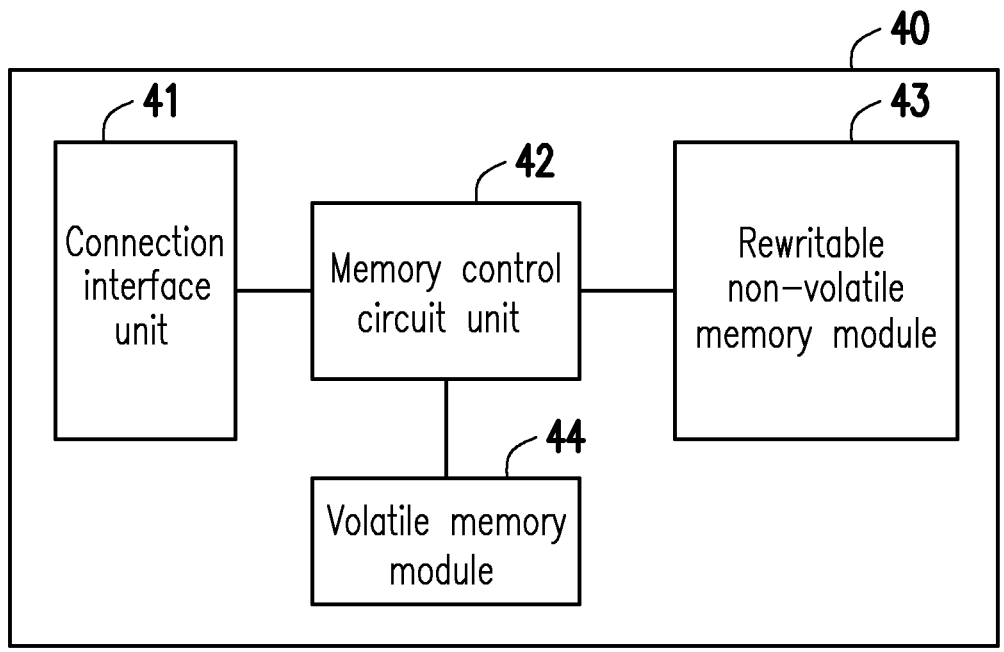
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. A memory storage device 40 includes a connection interface unit 41, a memory control circuit unit 42, a rewritable non-volatile memory module 43, and a volatile memory module 44.

The connection interface unit 41 is used to couple the memory storage device 40 to a host system. The memory storage device 40 may communicate with the host system via the connection interface unit 41. In an exemplary embodiment, the connection interface unit 41 is compliant with the PCI express standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or in the form of firmware and perform operations such as data writing, reading, and erasing in the rewritable non-volatile memory module 43 according to a command of the host system. In addition, the memory control circuit unit 42 may include the memory control circuit unit 11 of FIG. 1 or the memory control circuit unit 31 of FIG. 3.

The rewritable non-volatile memory module 43 is used to store data written by the host system. The rewritable non-volatile memory module 43 may include a single level cell (SLC) NAND type flash memory module (that is, a flash memory module that may store 1 bit in a memory cell), a multi level cell (MLC) NAND type flash memory module (that is, a flash memory module that may store 2 bits in a memory cell), a triple level cell (TLC) NAND type flash memory module (that is, a flash memory module that may store 3 bits in a memory cell), a quad level cell (QLC) NAND type flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage states. Through applying a read voltage, it is possible to judge which storage state a memory cell belongs to, so as to obtain one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND type flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area includes multiple physical sectors for storing user data, and the redundancy bit area is used to store system data (for example, management data such as the error correcting code). In an exemplary embodiment, the data bit area includes 32 physical sectors, and the size of one physical sector is 512 bytes (B). However, in other exemplary embodiments, the data bit area may also include 8, 16, more, or less physical sectors, and the size of each physical sector may also be greater or smaller. On the other hand, the physical erasing unit is the smallest unit of erasure. That is, each physical erasing unit includes the smallest number of memory cells to be erased together. For example, the physical erasing unit is a physical block.

The volatile memory module 44 is used for volatile storage of data. For example, the volatile memory module 44 may include volatile memory module 12 of FIG. 1 or the volatile memory module 32 of FIG. 3. The memory control circuit unit 42 may also be used to access the volatile memory module 44.

Figure 5:
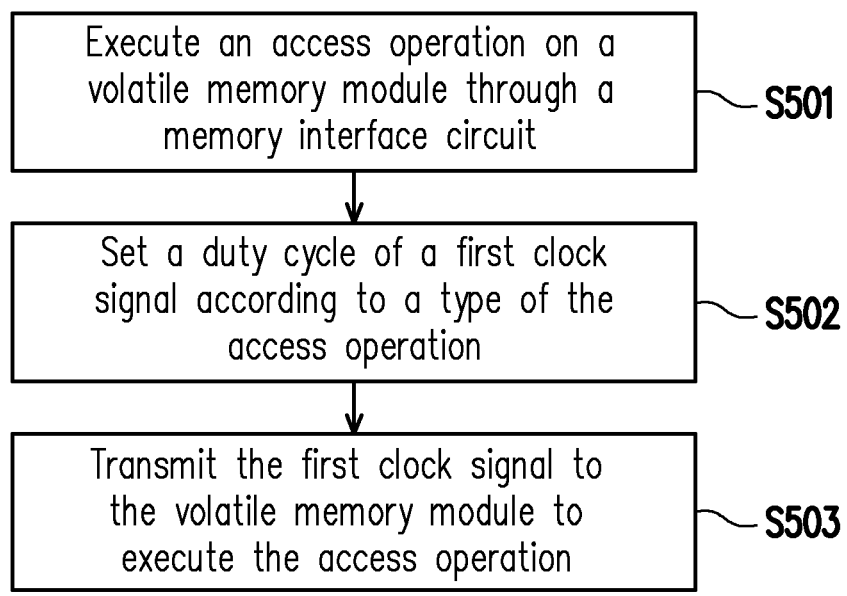
FIG. 5 is a flowchart of a voltage control method according to an exemplary embodiment of the disclosure.

FIG. 5 is a flowchart of a voltage control method according to an exemplary embodiment of the disclosure. Please refer to FIG. 5. In Step S501, an access operation is executed on a volatile memory module through a memory interface circuit. In Step S502, a duty cycle of a first clock signal is set according to a type of the access operation. In Step S503, the first clock signal is transmitted to the volatile memory module to execute the access operation.

However, each step in FIG. 5 has been described in detail as above and will not be repeated here. It is worth noting that each step in FIG. 5 may be implemented as multiple codes or circuits, which is not limited in the disclosure. In addition, the method of FIG. 5 may be used in conjunction with the above exemplary embodiments and may also be used alone, which is not limited in the disclosure.

In summary, the memory control circuit unit, the memory storage device, and the clock signal control method provided by the embodiments of the disclosure may dynamically adjust the duty cycle of the first clock signal according to different access operations, which can effectively improve the access signal quality of the volatile memory module.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory control circuit unit, configured to control a volatile memory module, the memory control circuit unit comprising:
   a memory interface circuit, configured to couple to the volatile memory module; and
   a memory controller, coupled to the memory interface circuit,
   wherein the memory controller is configured to execute an access operation on the volatile memory module through the memory interface circuit,
   the memory interface circuit is configured to set a duty cycle of a first clock signal according to a type of the access operation, and
   the memory interface circuit is further configured to transmit the first clock signal to the volatile memory module to execute the access operation,
   wherein the operation of the memory interface circuit setting the duty cycle of the first clock signal according to the type of the access operation comprises:
   in response to the access operation being a data read operation for reading data from the volatile memory module, setting the duty cycle of the first clock signal as a first duty cycle; and
   in response to the access operation being a data write operation for writing data into the volatile memory module, setting the duty cycle of the first clock signal as a second duty cycle different from the first duty cycle, and after the data write operation is completed, restoring the duty cycle of the first clock signal from the second duty cycle for the data write operation to the first duty cycle for the data read operation.

2. The memory control circuit unit according to claim 1, wherein the memory interface circuit is further configured to store duty cycle setting data, and the operation of in response to the access operation being the data write operation, setting the duty cycle of the first clock signal as the second duty cycle comprises:
   in response to the access operation being the data write operation, switching the duty cycle of the first clock signal from the first duty cycle to the second duty cycle according to the duty cycle setting data.

3. The memory control circuit unit according to claim 1, wherein the operation of the memory interface circuit setting the duty cycle of the first clock signal according to the type of the access operation further comprises:
   in response to a change in the type of the access operation, adjusting the duty cycle of the first clock signal.

4. The memory control circuit unit according to claim 1, wherein the memory interface circuit is further configured to transmit a second clock signal to the volatile memory module, and a duty cycle of the second clock signal is a default value.

5. The memory control circuit unit according to claim 1, wherein the memory interface circuit comprises:
   an internal clock generator; and
   a first clock path circuit, coupled to the memory controller, the internal clock generator, and the volatile memory module,
   wherein the internal clock generator is configured to generate an internal clock signal,
   the first clock path circuit is configured to generate the first clock signal according to the internal clock signal,
   the memory controller is configured to generate an enable signal according to the type of the access operation, and
   the first clock path circuit is further configured to adjust the duty cycle of the first clock signal according to the enable signal.

6. The memory control circuit unit according to claim 5, wherein the memory interface circuit further comprises:
   a write path circuit, coupled to the memory controller and the internal clock generator,
   wherein the write path circuit is configured to generate a data signal according to the enable signal, the internal clock signal, and an internal data signal, and
   the memory interface circuit is further configured to transmit the data signal to the volatile memory module.

7. The memory control circuit unit according to claim 5, wherein the memory interface circuit further comprises:
   a second clock path circuit, coupled to the internal clock generator and the volatile memory module,
   wherein the second clock path circuit is configured to generate a second clock signal according to the internal clock signal, and a duty cycle of the second clock signal is a default value, and
   the memory interface circuit is further configured to transmit the second clock signal to the volatile memory module.

8. A memory storage device, comprising:
   a connection interface unit, configured to couple to a host system;
   a rewritable non-volatile memory module;
   a volatile memory module; and
   a memory control circuit unit, coupled to the connection interface unit, the rewritable non-volatile memory module, and the volatile memory module,
   wherein the memory control circuit unit is configured to:
   execute an access operation on the volatile memory module through a memory interface circuit;

set a duty cycle of a first clock signal according to a type of the access operation; and transmit the first clock signal to the volatile memory module to execute the access operation, wherein the operation of the memory control circuit unit setting the duty cycle of the first clock signal according to the type of the access operation comprises:

in response to the access operation being a data read operation for reading data from the volatile memory module, setting the duty cycle of the first clock signal as a first duty cycle; and in response to the access operation being a data write operation for writing data into the volatile memory module, setting the duty cycle of the first clock signal as a second duty cycle different from the first duty cycle, and after the data write operation is completed, restoring the duty cycle of the first clock signal from the second duty cycle for the data write operation to the first duty cycle for the data read operation.

9. The memory storage device according to claim 8, wherein the memory control circuit unit is further configured to store duty cycle setting data, and the operation of in response to the access operation being the data write operation, setting the duty cycle of the first clock signal as the second duty cycle comprises:

in response to the access operation being the data write operation, switching the duty cycle of the first clock signal from the first duty cycle to the second duty cycle according to the duty cycle setting data.

10. The memory storage device according to claim 8, wherein the operation of the memory control circuit unit setting the duty cycle of the first clock signal according to the type of the access operation further comprises:

in response to a change in the type of the access operation, adjusting the duty cycle of the first clock signal.

11. The memory storage device according to claim 8, wherein the memory interface circuit is further configured to transmit a second clock signal to the volatile memory module, and a duty cycle of the second clock signal is a default value.

12. The memory storage device according to claim 8, wherein the memory interface circuit comprises:

an internal clock generator; and a first clock path circuit, coupled to a memory controller, the internal clock generator, and the volatile memory module, wherein the internal clock generator is configured to generate an internal clock signal, the first clock path circuit is configured to generate the first clock signal according to the internal clock signal, the memory controller is configured to generate an enable signal according to the type of the access operation, and the first clock path circuit is further configured to adjust the duty cycle of the first clock signal according to the enable signal.

13. The memory storage device according to claim 12, wherein the memory interface circuit further comprises:

a write path circuit, coupled to the memory controller and the internal clock generator, wherein the write path circuit is configured to generate a data signal according to the enable signal, the internal clock signal, and an internal data signal, and the memory interface circuit is further configured to transmit the data signal to the volatile memory module.

14. The memory storage device according to claim 12, wherein the memory interface circuit further comprises:

a second clock path circuit, coupled to the internal clock generator and the volatile memory module, wherein the second clock path circuit is configured to generate a second clock signal according to the internal clock signal, and a duty cycle of the second clock signal is a default value, and the memory interface circuit is further configured to transmit the second clock signal to the volatile memory module.

15. A clock signal control method for a memory control circuit unit, the clock signal control method comprising:

executing an access operation on a volatile memory module through a memory interface circuit;

setting a duty cycle of a first clock signal according to a type of the access operation; and transmitting the first clock signal to the volatile memory module to execute the access operation, wherein the step of setting the duty cycle of the first clock signal according to the type of the access operation comprises:

in response to the access operation being a data read operation for reading data from the volatile memory module, setting the duty cycle of the first clock signal as a first duty cycle; and in response to the access operation being a data write operation for writing data into the volatile memory module, setting the duty cycle of the first clock signal as a second duty cycle different from the first duty cycle, and after the data write operation is completed, restoring the duty cycle of the first clock signal from the second duty cycle for the data write operation to the first duty cycle for the data read operation.

16. The clock signal control method according to claim 15, wherein the memory interface circuit is configured to store duty cycle setting data, and the step of in response to the access operation being the data write operation, setting the duty cycle of the first clock signal as the second duty cycle comprises:

in response to the access operation being the data write operation, switching the duty cycle of the first clock signal from the first duty cycle to the second duty cycle according to the duty cycle setting data.

17. The clock signal control method according to claim 15, wherein the step of setting the duty cycle of the first clock signal according to the type of the access operation further comprises:

in response to a change in the type of the access operation, adjusting the duty cycle of the first clock signal.

18. The clock signal control method according to claim 15, further comprising:

transmitting a second clock signal to the volatile memory module, wherein a duty cycle of the second clock signal is a default value.

19. The clock signal control method according to claim 15, wherein the step of setting the duty cycle of the first clock signal according to the type of the access operation comprises:

generating an internal clock signal;

generating the first clock signal according to the internal clock signal;

generating an enable signal according to the type of the access operation; and adjusting the duty cycle of the first clock signal according to the enable signal.

20. The clock signal control method according to claim 19, further comprising:

generating a data signal according to the enable signal, the internal clock signal, and an internal data signal; and transmitting the data signal to the volatile memory module.

21. The clock signal control method according to claim 19, further comprising:

generating a second clock signal according to the internal clock signal, wherein a duty cycle of the second clock signal is a default value; and transmitting the second clock signal to the volatile memory module.

* * * * *